United States Patent [19]

Musschoot

[11] Patent Number: 4,471,891

[45] Date of Patent: Sep. 18, 1984

[54] UNIFORM MATERIAL DISCHARGE APPARATUS

[75] Inventor: Albert Musschoot, Barrington, Ill.

[73] Assignee: General Kinematics Corporation, Barrington, Ill.

[21] Appl. No.: 369,215

[22] Filed: Apr. 16, 1982

[51] Int. Cl.³ ............................................. B65G 59/08
[52] U.S. Cl. ..................................... 222/199; 209/393
[58] Field of Search ............... 222/199, 200, 189, 196; 209/393, 394, 395, 396, 235, 236, 245

[56] References Cited

U.S. PATENT DOCUMENTS

| | | | |
|---|---|---|---|
| 985,558 | 2/1911 | Thayer | 209/394 |
| 1,742,350 | 1/1930 | Hatch | 222/199 X |
| 2,789,733 | 4/1957 | Secord, Jr. | 222/199 X |
| 3,003,667 | 10/1961 | Jonsson | 222/199 |
| 3,993,567 | 11/1976 | Ginaven | 209/393 |

Primary Examiner—Stanley H. Tollberg
Attorney, Agent, or Firm—Wood, Dalton, Phillips, Mason & Rowe

[57] ABSTRACT

In a material discharge apparatus, a uniform depth of material is conveyed from the discharge opening of a stationary hopper. The hopper has a rectangularly shaped discharge opening disposed generally in a horizontal plane. A conveyor is disposed below the discharge opening and has a material receiving and conveying trough which is tilted at an acute angle to the horizontal plane. The angular disposition of the trough receives the material from the opening at a substantially uniform depth along the length of the conveyor and conveys the material with the substantially uniform depth to a downstream location. A grate is carried by the conveyor below the discharge opening for supporting the material and for controlling flow of the material from the opening.

7 Claims, 7 Drawing Figures

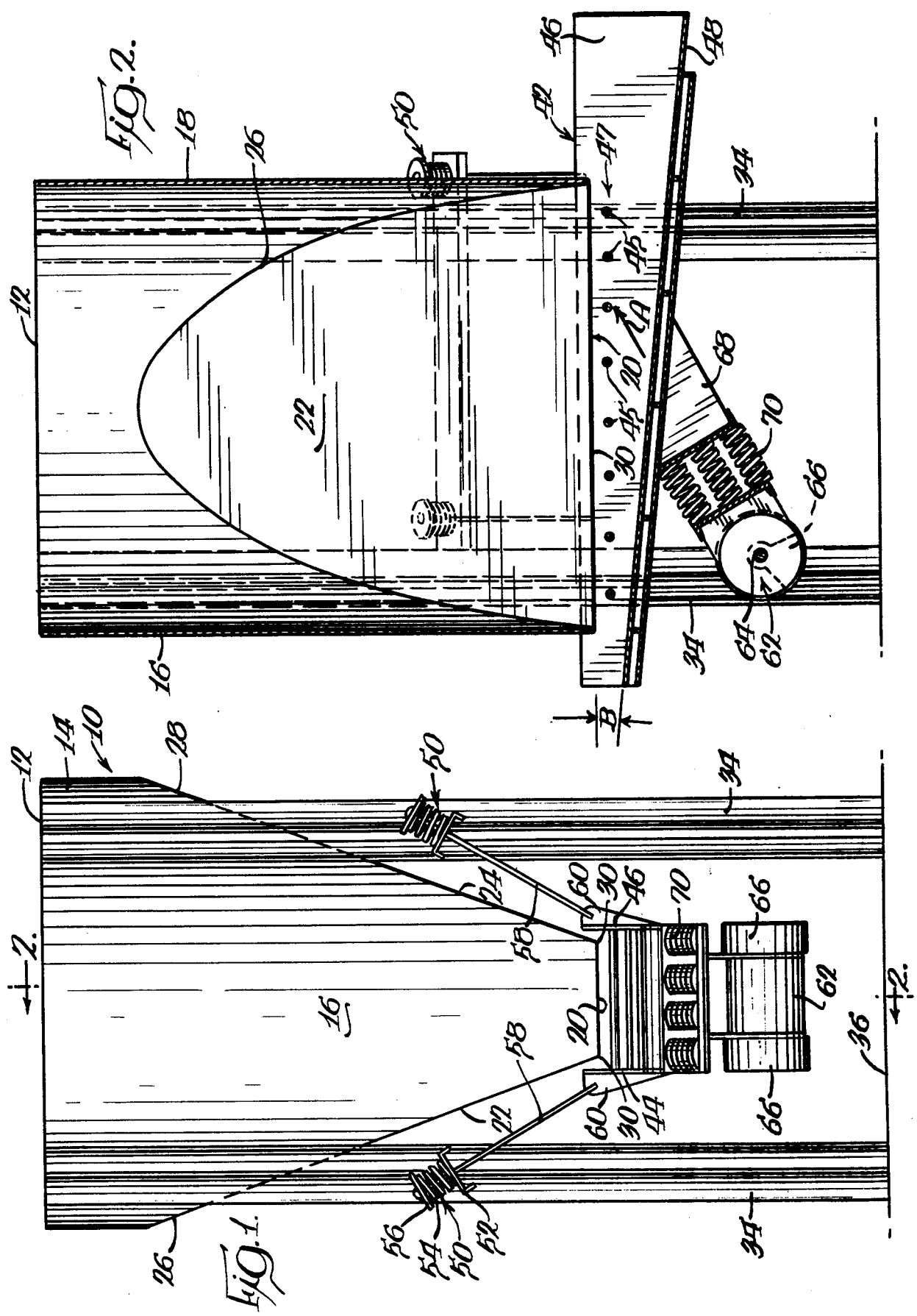

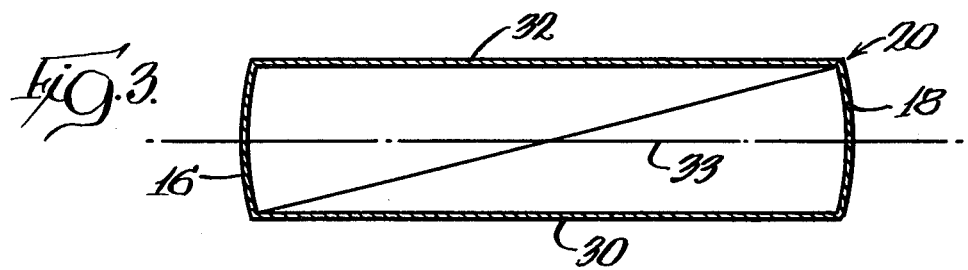
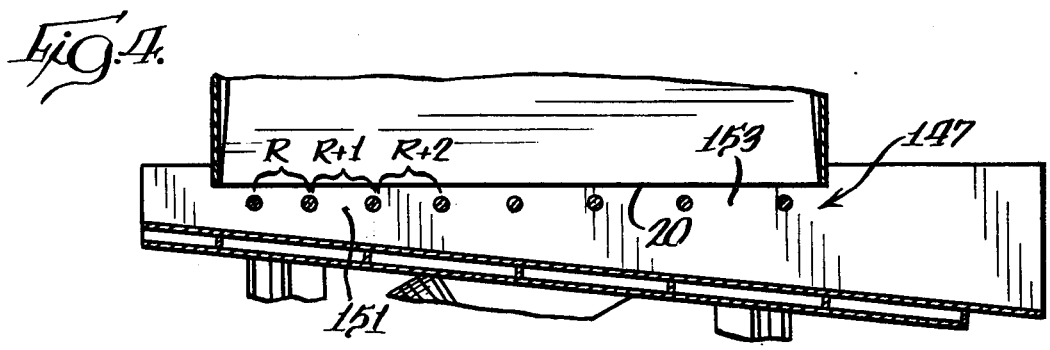
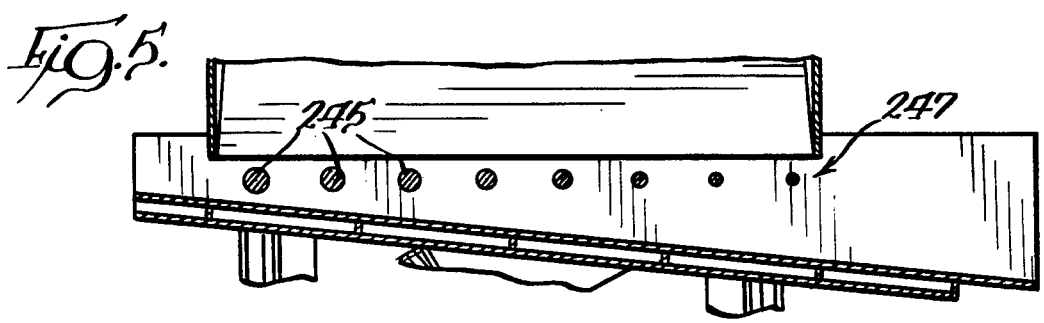
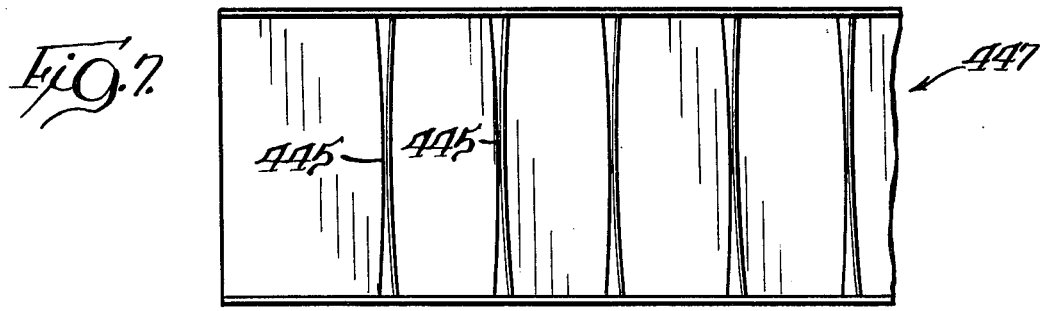

UNIFORM MATERIAL DISCHARGE APPARATUS

DESCRIPTION

1. Technical Field

This invention relates generally to a material discharge apparatus and more particularly to uniform material discharge from a hopper.

2. Background Art

In hopper design and in particular hoppers with elongate discharge openings, flow of material from the discharge openings onto conveyors, for instance, a belt conveyor, frequently causes uneven discharge of material from the hopper. That is, it has been found that more material is discharged from one end of the discharge opening of the hopper than from the other end. The uneven discharge of material from the discharge opening unbalances the flow of material in the hopper resulting in ratholes, hangups and other problems.

One solution proposed heretofore was to change the shape of the hopper discharge opening whereby the upstream end of the hopper was made relatively narrow and uniformly enlarges toward the downstream end of the hopper. With the tapered discharge opening, the discharge of material from the hopper was more uniform, but it created other problems, such as hangups due to the constriction of flow of material at the narrow end of the hopper discharge opening.

The present invention is directed to overcoming one or more of the problems as set forth above.

DISCLOSURE OF THE INVENTION

In one aspect of the present invention, a hopper is provided with a uniformly sized elongate rectangular discharge opening below which is mounted a vibratory conveyor for conveying bulk material discharged from the hopper. The vibratory conveyor is positioned at an angle to the horizontal plane containing the discharge opening of the hopper and has two or more grate bars extending transverse to the longitudinal, or long, axis of the rectangular opening. The angle of the conveyor to the horizontal and the grate bars combine to discharge bulk material from the hopper uniformly along the longitudinal axis of the opening. The grate bars, traversing the width of the opening, support the material across the width of the opening and divide the flow of material between the upstream and downstream sides of each grate bar when the conveyor is operated. The vibratory conveyor picks up from the upstream side of the hopper substantially the same amount of material as from the downstream side, and the material is distributed to a uniform depth along the conveyor. Using the angled vibratory conveyor with the grate bars makes it possible to evenly discharge the material from the hopper and to evenly pile and move the material along the length of the conveyor. The grate bars may be all of the same diameter or may be of different diameters. The grate bars may be uniformly spaced apart or may have different spacings between different grate bars. The grate bars may be of uniform diameter throughout their lengths or may taper in thickness from the ends of the midportion, i.e. thinner at each end and thicker in the center. All of the variations in the grate bar are to improve the support of the material in the hopper and to improve distribution of the material from the hopper onto the conveyor.

BRIEF DESCRIPTION OF THE DRAWINGS

FIG. 1 is an end view of a hopper, in this case a chisel point hopper, for storing bulk materials with a vibratory conveyor mounted at an angle below the discharge opening of said hopper;

FIG. 2 is a side elevational view of the hopper and conveyor of FIG. 1, showing the grate structure on the hopper;

FIG. 3 is a reduced sized view of the discharge opening of the hopper of FIGS. 1 and 2;

FIG. 4 is a broken away portion of the hopper of FIG. 2 showing a modified form of grate structure wherein the grate bars are non-uniformly spaced apart;

FIG. 5 is a broken away portion of the hopper of FIG. 2 showing another modified form of grate structure wherein the grate bars are of different diameters; and FIGS. 6 and 7 are broken away portions of the hopper of FIG. 2 showing modified forms of grate structures wherein the grate bars vary in thickness along the lengths thereof.

BEST MODE FOR CARRYING OUT THE INVENTION

Referring to FIGS. 1 and 2, the apparatus is illustrated for use with a substantially chisel shaped hopper 10 which has an open top 12 through which material is supplied to the hopper. The hopper 10 is defined by a generally cylindrically shaped upper portion 14 and a generally rectangularly shaped lower portion 15. The hopper has end walls 16 and 18, extending substantially vertically all the way from the open top 12 of the upper portion 14 to a discharge opening 20 at the bottom of the lower portion 15 of the hopper. At right angles to the vertical end walls 16 and 18 and on diametrically opposite sides of the hopper, are two planar sloping side walls 22 and 24 which intersect with the cylindrical portion 14 of the hopper to form substantially U-shaped junctions 26 and 28 with the hopper 10. The respective planar side walls 22 and 24 converge downwardly and inwardly toward each other to form a pair of parallel spaced apart edges 30 and 32 on opposite sides of the opening 20. The edges 30 and 32 and the termini of the vertical end walls 16 and 18 define the opening 20 as an elongate somewhat rectangular opening having a long axis 33 (FIG. 3) extending midway between the edges 30 and 32 and lying parallel to the edges 30 and 32. The hopper 10 is supported on columns or beams 34, which join with the upper portion 14 of the hopper as by welding or the like. The columns 34 support the hopper in a way that the plane of the opening 20 is horizontal and spaced from a floor or work surface 36.

Mounted below the hopper and generally in alignment with the opening 20 is a vibratory conveyor 40 which may generally follow the form and operating characteristics of any vibratory conveyor such as shown in the Albert Musschoot et al U.S. Pat. No. 3,089,582, issued May 14, 1963. The vibratory conveyor includes a trough 42 having side walls 44 and 46 and an interconnecting bottom panel 48. Extending transverse to the longitudinal axis of the trough 42 and fastened to the two side walls 44 and 46 are a plurality of grate bars 45 which form a grate 47 below the opening 20 in the hopper. The grate 47 lies in a plane substantially parallel to the opening 20 with the grate bars 45 traversing the width of the opening 20 and being vibrated simultaneously with the conveyor 40.

The trough 42 is mounted resiliently on resilient supports 50 carried by the respective columns 34. Each resilient support 50 is comprised of a bracket 52 welded or otherwise secured to one column 34 to which is mounted a coil spring 54 having a cap 56 on the other end thereof. A tie rod 58 extends through the cap and spring as well as through the bracket and is connected to a flange 60 projecting sideways from the respective ends of the side walls 44 and 46 of the trough. The resilient members 50 are angularly disposed with respect to the trough in such a way that the tie rods 58 lie along axis at angles substantially equal to each other relative to the vertical plane through the hopper 10. In this way, the vibratory conveyor apparatus is supported resiliently and uniformly relative to the hopper. With the resilient mounting, the trough 42 may have a vibratory movement along a generally straight line path as indicated by the arrow A in FIG. 2. With the movement of the trough 42 along the vibratory path A, material from the hopper 10 is advanced at a controlled rate corresponding to the rate of vibration. The vibratory conveyor may be used for moving a wide variety of solid materials that may be stored in the hopper.

A typical example of a structure for vibrating the trough 42 along the path A comprises a resonant spring weight system in which one mass is that of the trough 42 and a second mass is that of a motor 62 with a double ended shaft 64 which carries eccentric weights 66 on both ends thereof. The motor is suspended from an angularly disposed platform 68 connected to the bottom 48 of the trough by a plurality of springs 70.

It will be noted particularly in FIG. 2 that the discharge opening 20 of the hopper lies generally in a horizontal plane while the plane of the bottom 48 of the hopper 42 is disposed at an acute angle to the plane of the opening 20. The acute angle between the opening 20 and the bottom 48 of the hopper 42 is designated by the letter B and is adjusted to accommodate the type of material being conveyed, the rate of vibration of the vibratory conveyor, and the length and width of the opening 20. The grate 47 with the grate bars 45 extending between the walls 44 and 46 both supports the material in the hopper 10 and divides the flow of material around each bar 45. That is, in the static state, material in the hopper will be supported both by the grate bars 45 and by the trough 42 of the vibratory conveyor. With the conveyor 40 energized, the trough 42 and bars 45 will both be vibrating with the conveyor conveying material along the conveyor and with the grate bars 45 equalizing and dividing the flow to the trough 42. The bars 45 support the material at the midportion of the opening so that the flow around each bar is equalized along the length of each bar.

Heretofore, without the bars 45 there was a tendency for the material to flow faster at the midportion of the opening than at the sides of the opening, a phenomenon that contributed to ratholing in the hopper and the like. With the bars 45 and the slope of the trough 42 it is possible to have a rectangular discharge opening in the hopper and still have uniform flow from the hopper and uniform piling of material on the conveyor. In one particular operative device the material being stored in the hopper and being conveyed was a lumpy material such as coal, the elongate length of the hopper opening was 8 feet and the angle B of the bottom of the hopper to the plane of the opening was set at 6°. The rate of vibration of the vibratory feeder was adjusted so that a uniform even rate of flow of material was discharged from the hopper and was conveyed to a downstream station.

Referring to FIG. 4, a modified form of grate 147 is disposed on the trough 42 of the conveyor 40 beneath the discharge opening 20 of the hopper 10. The grate 147 includes plural grate bars 145 which are of uniform diameter but are spaced closer together at the upstream portion 151 of the hopper than at the downstream portion 153. The spacing of the grate bars 145 can be uniform for a predetermined part of the upstream portion 151 and then be a uniformly greater spacing throughout the downstream portion 153 of the opening 20. In the alternative, and as is illustrated in FIG. 4, starting at the left-hand upstream portion 151 of the opening 20, the first grate bar 145 is spaced a distance R from the adjacent grate bar which in turn is spaced a distance R+1 from next adjacent downstream grate bar 145 and so on as you move to the right or downstream portion 153 of the opening 20. For materials that traditionally form ratholes on the upstream side of a conveyor, the closer spacing of the grate bars 145 upstream of the opening 20 provides greater support for the material in the hopper on the upstream side of conveyor thereby slowing down discharge from the hopper on the upstream side preventing a rathole on that side of the hopper. The result is a more uniform discharge of material from the hopper onto the conveyor.

FIG. 5 shows another modified form of grate 247 on the trough 42 of the conveyor 40 beneath the discharge opening 20 of the hopper. The grate 247 has plural grate bars 245 which have different diameters throughout their lengths. The larger diameter grate bar 245 is mounted upstream of the opening 20 with each successive downstream grate bar 245 being of a smaller diameter. The center to center spacing of the grate bars 245 are shown uniform but they could be varied as required. The larger diameter grate bars 245 upstream provides the support and flow control needed to create a uniform rate of discharge onto the conveyor throughout the length of the opening 20. The spacing of the grate bars 245 can also be varied to take advantage of the principle of the varied spacing as enunciated above.

FIGS. 6 and 7 show greates 347 and 447, having grate bars 345 and 445, respectively. The grate bars 345 are thicker in the midportions than at the end portions. The grate bars 445 are thicker at the end portions than at the midportions. The grate bars 345 that are thicker in the midportion provide greater support and flow control in the mid region of the opening 20 and are particularly useful with materials that have a tendency to develop ratholes in the midportion of the hopper. The grate bars 445 that are thicker at the end portions provide greater support and flow control near the sloping sides of the hopper and are particularly useful with materials that tend to flow too rapidly along the sloping sides of the hopper. The principle of varying the spacing of the grate bars 345 and 445 as well as the use of different basic diameter bars as described hereinabove is equally useable with the grate bars 345 and 445.

Although the grate bars are shown as round in cross-section, it is to be understood that the bars may be triangular, oval, tear drop or the like, all without departing from the invention.

INDUSTRIAL APPLICABILITY

In material flow storage and discharge apparatus, a particular problem has been noted during discharge of material from the hopper when horizontally disposed conveyors were used. It has been found that the flow characteristics of a hopper in combination with a horizontally disposed conveyor resulted in more material being discharged on the upstream end of the hopper, which material was in effect pulled under the material on the downstream side of the hopper so that the material in the hopper discharged unevenly, causing ratholes on the upstream side of the hopper and stagnation on the downstream side of the hopper. Stagnation of materials such as coal can cause many problems, not the least of which is the possibility of fire and the like.

One solution proposed hereinbefore was to taper the cross-section of the opening in the bottom of the hopper so that a relatively narrow opening was provided on the upstream side of the hopper with a relatively wide opening at the downstream side. The tapered opening in the hopper channeled the flow of material from the hopper onto the horizontal conveyor somewhat more uniformly but did result in more material being discharged in the downstream side of the hopper with just the reverse problems noted heretofore.

By using a conventional rectangular opening in the hopper and canting or tilting the vibratory conveyor with grate bars by an acute angle B to the horizontal plane of the opening of the hopper, the material is fed from the hopper onto the conveyor in a substantially uniform depth. The depth of the material on the conveyor or trough is constant so that a constant and uniform depth of material is delivered to the discharge end of the vibratory conveyor. At the same time, the material discharged from the hopper is substantially uniform from the upstream side to the downstream side so that the level of material in the hopper is lowered in a substantially uniform manner.

For different materials and for different vibratory rates provided by an adjustable vibratory feeder apparatus, the angle B may be changed so as to accomplish the uniform discharge of material from the hopper and the uniform flow of material along the vibratory conveyor to a discharge station at the end of the conveyor.

To accommodate different materials having different flow and storage characteristics, the grate bars in the grate may be spaced apart different distances at different portions of the hopper opening (i.e. closer together upstream than downstream), or the grate bars may have different diameters at different portions of the hopper opening (i.e. larger diameter bars upstream than downstream), or the thickness of the bars can be varied between the ends and the midportion (i.e. narrow at the ends and thick in the middle or vise versa), all with the view toward providing flow control and support to the material in the hopper to eliminate ratholes and uneven flow from the hopper and to deposit a substantially uniform depth of material onto the conveyor for conveying to a discharge station.

I claim:

1. A hopper discharge apparatus comprising a stationary hopper tapering to a horizontally disposed, elongate rectangular shaped opening having a longitudinal axis coinciding with the long axis of the rectangular opening, conveyor means mounted below said opening and having a trough with a longitudinal axis coinciding with the longitudinal axis of the opening, said trough receiving material discharged from said opening in the hopper, means for vibrating said trough in a generally straight-line path for moving said material in a direction along the longitudinal axis of the trough, the trough being supported at an acute angle to the plane containing said opening in the hopper, said angle providing tilt to the trough downwardly in the direction of movement of the material on said trough, means for supporting the material in the hopper and for controlling the flow onto the conveyor means, said means for supporting the material comprising a grate means carried by the conveyor means in alignment with said opening in the hopper, said grate means extending transversely to the longitudinal axis of the trough and defining a plurality of unobstructed vertical paths for the material between the hopper and the trough, whereby material is discharged uniformly from the hopper onto the trough and is deposited at a uniform depth on said trough as it is moved along said vibratory conveyor means.

2. A hopper discharge apparatus comprising a stationary hopper having a horizontally disposed rectangular shaped discharge opening with a longitudinal axis coinciding with the long axis of the rectangular opening, conveyor means mounted below said opening and having a longitudinal axis coinciding with the longitudinal axis of the opening, said conveyor means receiving and moving material discharged from said opening in the hopper, grate means on the conveyor for vibratory movement with the conveyor, said grate means lying in a plane parallel to the plane of the opening in the hopper, said conveyor means having a trough supported at an acute angle to the plane containing said opening in the hopper, said grate means extending transversely to the longitudinal axis of the trough and defining a plurality of unobstructed vertical paths for the material between the hopper and the trough, said angle providing a tilt to the trough downwardly in the direction of movement of the material on said conveyor whereby material is discharged uniformly from the hopper onto the conveyor and is moved by said conveyor to a downstream discharge point.

3. A hopper discharge apparatus comprising a stationary hopper having a rectangular discharge opening with a longitudinal axis coinciding with the long axis of the rectangular opening, a vibratory conveyor mounted below said opening and having a trough with a longitudinal axis coinciding with the longitudinal axis of the opening, said trough receiving material discharged from said opening in the hopper, grate bars carried by the conveyor and extending transverse to the longitudinal axis of the trough, said grate bars being spaced closer together at the upstream portion of the conveyor than at the downstream portion thereof, means for vibrating said trough in a generally straight-line path for moving said material on the trough in a direction along the longitudinal axis of the trough, the trough being supported at an angle to the horizontal plane coinciding with said opening in the hopper, said angle providing a tilt to the trough downwardly in the direction of movement of the material on said trough whereby material is discharged uniformly from the hopper past said grate bars onto the trough and moved along said vibratory conveyor.

4. A hopper discharge apparatus comprising a stationary hopper having a horizontally disposed rectangularly shaped discharge opening with a longitudinal axis coinciding with the long axis of the rectangular opening, conveyor means mounted below said opening and having a longitudinal axis coinciding with the longitudinal axis of the opening, said conveyor means receiving and moving material discharged from said opening in the hopper, grate means on the conveyor means for vibratory movement with the conveyor means, said grate means lying in a plane parallel to the plane of the opening in the hopper, said grate means comprising plural grate bars extending transverse to the longitudinal axis of the conveyor means and defining a plurality of unobstructed vertical paths for the material between the hopper and the conveyor means, said conveyor means having a trough supported at an acute angle to the plane containing said opening in the hopper, said angle providing a tilt to the trough downwardly in the direction of movement of the material on said conveyor means whereby material is discharged uniformly from the hopper onto the conveyor means and is moved by said conveyor means to a downstream discharge point.

5. The apparatus as claimed in claim 4 wherein said grate bars are of a larger cross-sectional area at the upstream portion of the conveyor means than at the downstream portion thereof.

6. The apparatus as claimed in claim 4 wherein said grate bars have thicker midportions than end portions thereof.

7. The apparatus as claimed in claim 4 wherein the cross-section shape of said grate bars is selected from the group consisting of round, triangular, tear drop and oval.

* * * * *